United States Patent
Berry et al.

(10) Patent No.: US 7,244,331 B1
(45) Date of Patent: Jul. 17, 2007

(54) METHOD OF PRODUCING AN LTCC SUBSTRATE WITH CAVITIES HAVING IMPROVED BONDABILITY

(75) Inventors: Cynthia W. Berry, Pasadena, MD (US); Alex E. Bailey, Hampstead, MD (US); Tapan K. Gupta, Ellicott City, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/959,121

(22) Filed: Oct. 7, 2004

(51) Int. Cl.
*B32B 37/10* (2006.01)
*B32B 38/00* (2006.01)

(52) U.S. Cl. .......... 156/289; 156/89.11; 156/89.12

(58) Field of Classification Search ......... 156/89.12, 156/289
See application file for complete search history.

(56) References Cited

U.S. PATENT DOCUMENTS

| | | | | |
|---|---|---|---|---|
| 4,458,721 A | * | 7/1984 | Yie et al. | 138/93 |
| 5,350,623 A | * | 9/1994 | Derrick | 428/217 |
| 5,538,582 A | * | 7/1996 | Natarajan et al. | 156/285 |
| 5,683,535 A | | 11/1997 | Karr | |
| 5,788,808 A | * | 8/1998 | Natarajan et al. | 156/580 |
| 5,876,539 A | | 3/1999 | Bailey et al. | |
| 5,972,140 A | * | 10/1999 | Hass et al. | 156/89.11 |
| 6,423,174 B1 | * | 7/2002 | Casey et al. | 156/285 |
| 6,440,566 B1 | * | 8/2002 | Maligie et al. | 428/412 |
| 6,673,180 B2 | | 1/2004 | Harada | |
| 6,673,181 B1 | | 1/2004 | Berry et al. | |
| 2005/0109453 A1 | * | 5/2005 | Jacobson et al. | 156/253 |

FOREIGN PATENT DOCUMENTS

| JP | 9-39160 | * | 2/1997 |
|---|---|---|---|
| JP | 2003-289119 | * | 10/2003 |

* cited by examiner

*Primary Examiner*—Melvin Mayes
(74) *Attorney, Agent, or Firm*—Birch, Stewart, Kolasch & Birch, LLP

(57) ABSTRACT

A method of producing an LTCC substrate having improved cavity bondability is disclosed that involves providing a stack of green ceramic tape sheets having a cavity, placing a template having an opening corresponding to the cavity over the stack, placing a stretchable sheet of material coated with graphite or zinc stearate over the template, isostatically laminating the stack to produce an LTCC substrate having a cavity, and removing the template and sheet of stretchable material from the stack.

15 Claims, 5 Drawing Sheets

METHOD OF PRODUCING AN LTCC SUBSTRATE WITH CAVITIES HAVING IMPROVED BONDABILITY

FIELD OF THE INVENTION

The present invention is directed toward a method of producing a low-temperature, cofired ceramic (LTCC) substrate with cavities having improved bondability, and, more specifically, toward a method of producing an LTCC substrate having cavities, using a stretchable sheet of material to transfer pressure to the cavities, which cavities have a bondability similar to the bondability of the surrounding substrate.

BACKGROUND OF THE INVENTION

Low temperature cofired ceramic (LTCC) substrates used in connection with electronic circuitry, and more particularly integrated circuits, are generally well known and typically comprise a multilayered structure of ceramic material which includes stripline circuit patterns and openings therethrough called vias for providing circuit interconnection between layers. The layers are laminated together by externally applied pressure from, for example, a hydrostatic press. Such a press may apply pressure on the order of 250 to 6000 psi or higher to the laminate components.

Many such substrates have cavities in their surfaces. To apply pressure evenly to the cavities, silicone molds having a shape corresponding to the cavities may be placed in the cavities. As the cavities have become more numerous and complex in shape, having, for example, internal ledges and other non-uniform features, the silicone molds have become more complex as well and therefore more expensive.

One method for forming LTCC substrates without using silicone molds is disclosed in U.S. Pat. No. 5,683,535, entitled "Method and Apparatus of Producing Cavities in LTCC Substrates," the entire contents of which are hereby incorporated by reference. A method similar to the one described in that patent is outlined below.

FIG. 1 illustrates a stack of a plurality of green, unfired, LTCC sheets 12 on a stainless steel tooling plate 14 having one or more alignment pins 16 which receive corresponding holes 18 in the LTCC sheets 12. The stack includes a plurality of cavities 24. A 0.025 in. thick polyimide template 20 having openings 22 corresponding to the cavities is placed over the stack 12. The cavities 24 may include various internal ledges and internal features such as ledges 25.

In order to protect the corners of the cavities 24 and to reduce rounding of the edges thereof during the lamination process, a single sheet 36 of 0.008 in. thick talc coated latex rubber is placed over the template. Next, pairs of 0.125 in. thick silicone foam sheets 28 and 30 are trimmed to the required area of the parts and are placed above and below the assembly including the tooling plate 14, template 20, and silicone mold 26. The assembly is then placed in a flexible vacuum bag, shown schematically by reference numeral 32. The silicone rubber sheets 28 and 30 act as a protective barrier to keep the vacuum bag 32 from being punctured by a rigid edge of the lamination stack-up assembly located therebetween.

The vacuum bag 32 and its contents are then placed in a hydrostatic pressure chamber shown by the phantom lines 34. The hydrostatic pressure chamber 34 generates a pressure of between about 250 psi and 6000 psi which isostatically laminates the LTCC sheets 12 together, forming a composite substrate structure.

Metallic wires, ribbons and similar elements are sometimes attached to a substrate after the lamination process. The bonds between these elements and the substrate must be sufficiently strong to prevent separation during normal use. It has been found, however, that the bondablity of the cavity interiors is generally less than the bondability of the substrate surfaces surrounding the cavities. This difference is particularly noticeable in substrates made according to the process disclosed in U.S. Pat. No. 5,683,535. It would therefore be desirable to provide a method of producing an LTCC substrate having cavities that avoids the need for separate molds in each cavity while at the same time producing cavities having acceptable levels of bondability.

SUMMARY OF THE INVENTION

These problems and others are addressed by the present invention which comprises, in a first aspect, a method of producing an LTCC substrate having improved cavity bondability that involves providing a stack of green ceramic tape sheets having a cavity and a template having an opening corresponding to the opening in the stack. The template is placed over the stack with the opening aligned with the cavity. A sheet of stretchable material having graphite applied thereto is placed over the template with the graphite toward the template, and the tape sheets, template and sheet of stretchable material are isostatically laminated to produce an LTCC substrate having a cavity. Then the template and sheet of stretchable material are removed from the stack.

Another aspect of the invention comprises a method of producing an LTCC substrate having improved cavity bondability that involves providing a stack of green ceramic tape sheets having a cavity and a template having an opening corresponding to the opening in the stack. The template is placed over the stack with the opening aligned with the cavity. A sheet of stretchable material having zinc stearate applied thereto is placed over the template with the zinc stearate toward the template, and the tape sheets, template and sheet of stretchable material are isostatically laminated to produce an LTCC substrate having a cavity. Then the template and sheet of stretchable material are removed from the stack.

A further aspect of the invention comprises a method of producing an LTCC substrate having improved cavity bondability that involves providing a stack of green ceramic tape sheets having a cavity and applying zinc stearate to the stack. Next, a template having an opening corresponding to the opening in the stack is placed over the stack with the opening aligned with the cavity. Then a sheet of stretchable material is placed on the template, and the tape sheets, template and stretchable sheet are isostatically laminated to produce an LTCC substrate having a cavity. The template and sheet of stretchable material are then removed from the stack.

BRIEF DESCRIPTION OF THE DRAWINGS

These aspects of the invention and others will be better understood after a reading of the following detailed description in connection with the following drawings, wherein.

DETAILED DESCRIPTION

It would appear initially that all parts of the substrate are exposed to the same conditions during lamination. Therefore, various aspects of the substrate manufacturing process, from the laser cutting of the cavities in the LTCC sheets to the stacking and lamination thereof, had to be considered to determine why the cavities exhibited lower bondability.

As a first step in determining why the cavities exhibited a lower bondability that the rest of the substrate, the substrates made by the above conventional process were analyzed with scanning electron microscopy and Auger spectroscopy. These analyses revealed that magnesium and silicon contaminants were present in the cavities, but not on the substrate regions between the cavities. Because the talc coated latex contacted the cavity interiors during lamination, but did not contact the regions between the cavities, it appeared that the contaminants were residues from the talc release agent used in the above process. It was therefore theorized that these contaminants could be affecting the bondability of the cavity interiors. Different release agents were therefore tested to determine whether 1) their use would eliminate the magnesium and silicon residues and 2) whether the removal of such residues would improve bondability.

It was found that graphite, in the form of a powder or an aerosol spray, applied to the flexible sheet 36 substantially prevented sticking when the latex sheet 36 is removed from the substrate. At the same time, the graphite did not affect the subsequent bondability of the substrate. Likewise, zinc stearate, applied as a powder or a spray, substantially prevented the latex sheet from sticking to the substrate. The zinc stearate also did not adversely affect the bondability of the substrate. Beneficially, the zinc stearate may be applied directly to the substrate instead of the sheet 36 if desired. While the graphite would also prevent sticking if applied directly to the substrate, it could potentially also damage the substrate and thus this method of graphite application is not recommended.

Figure 1:
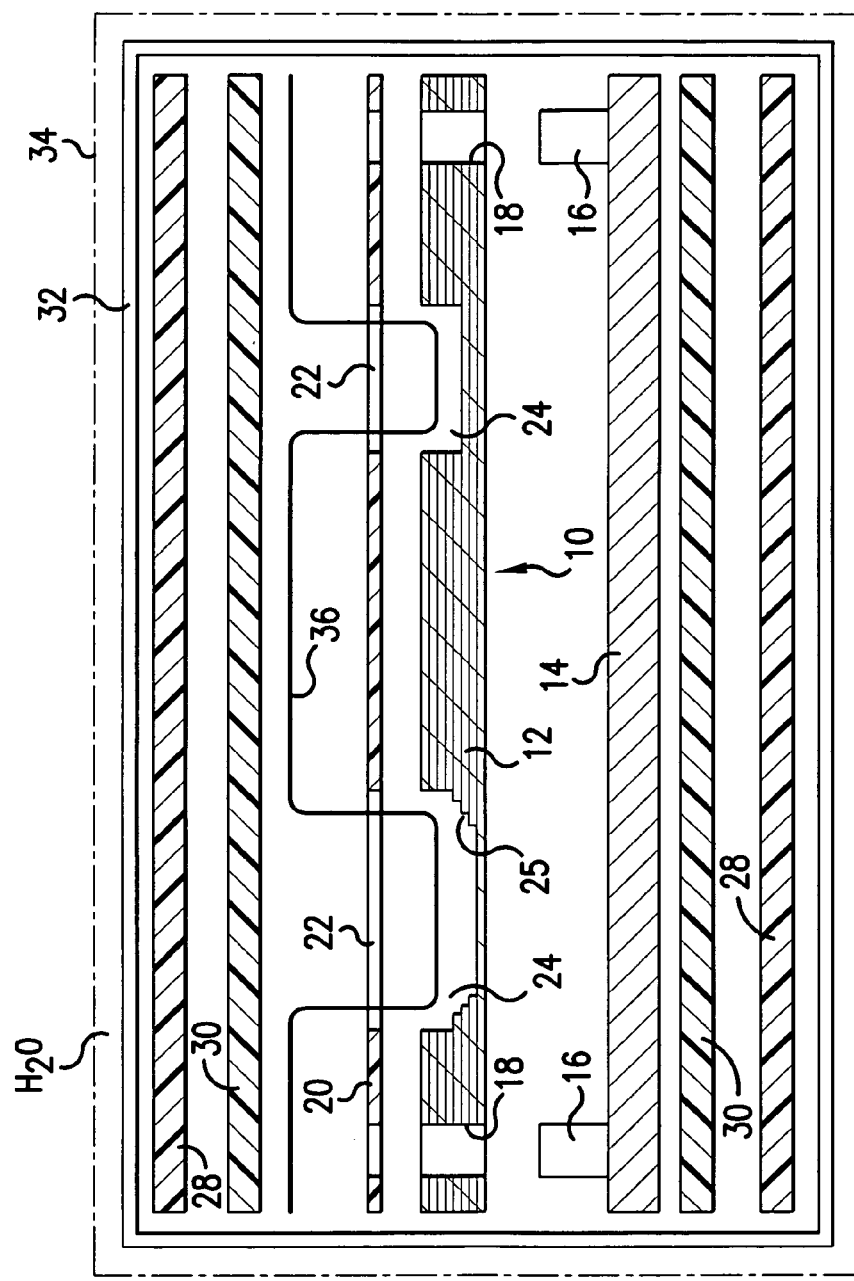
FIG. 1 is an exploded perspective view of an LTCC substrate and elements compressed therewith during an isostatic lamination process.
Figure 2:
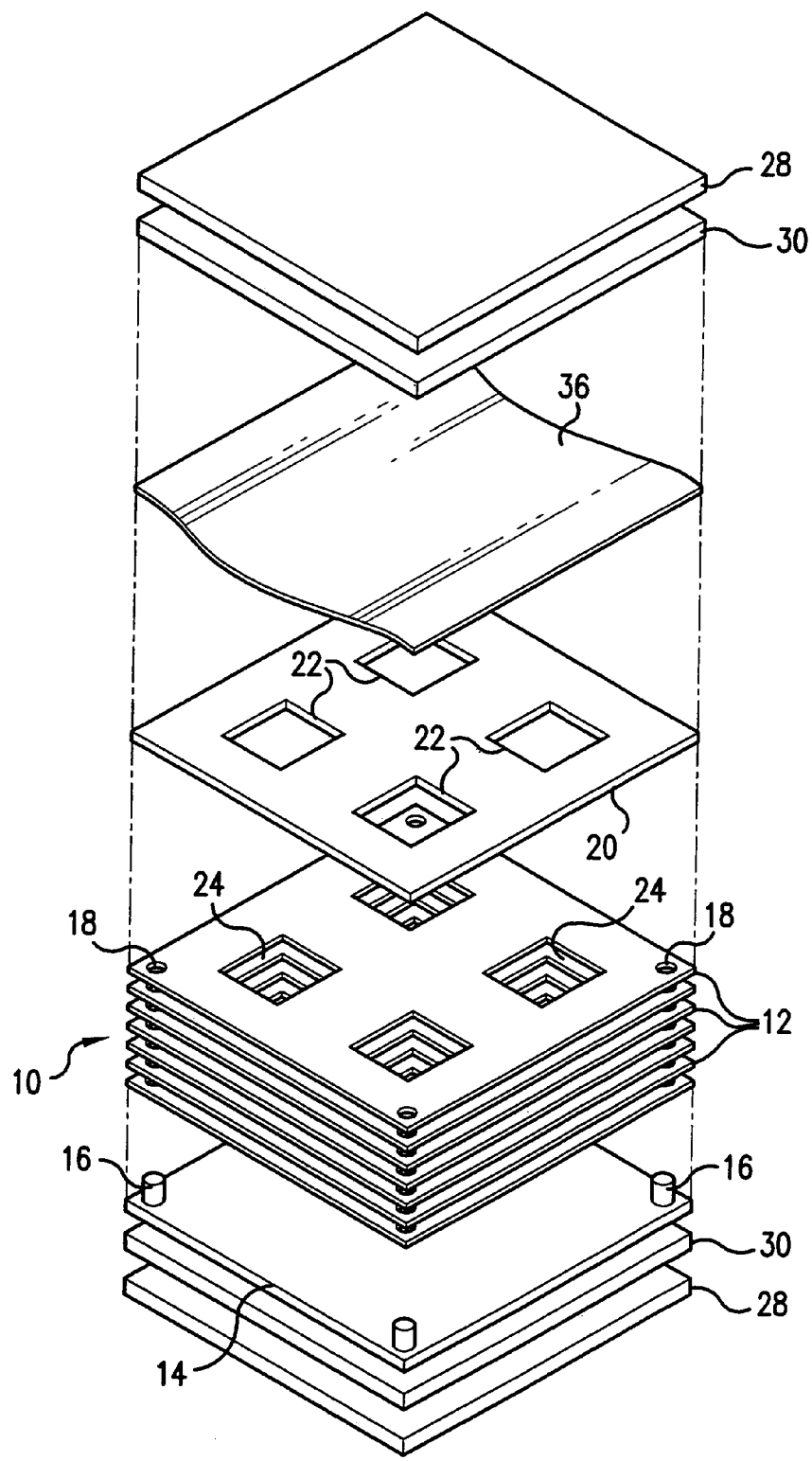
FIG. 2 is a sectional elevational view of the elements of FIG. 1 shown assembled and inside an isostatic pressure chamber.
Figure 3:
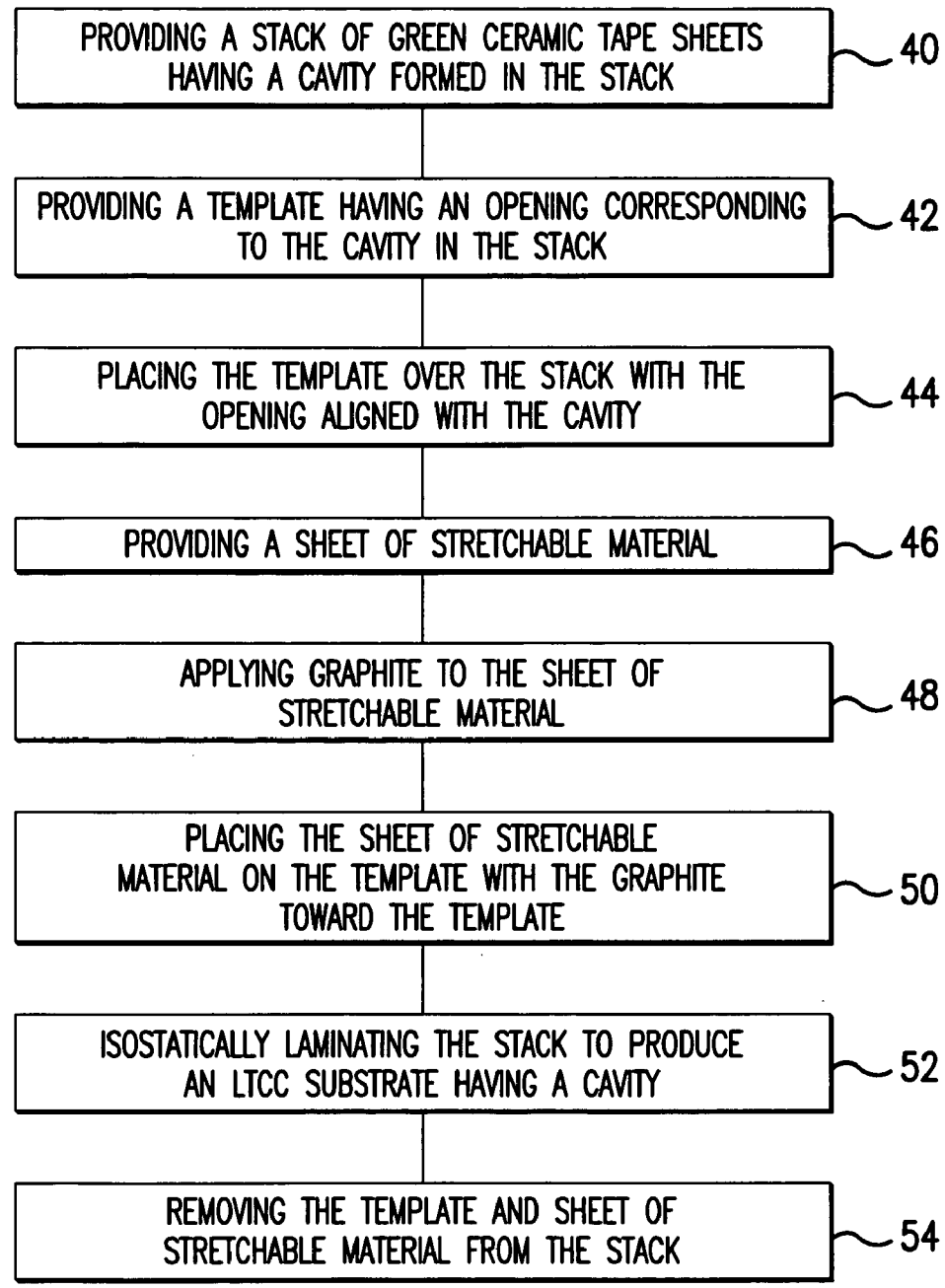
FIG. 3 is a flow chart illustrating a first method of producing an LTCC substrate according to an embodiment of the invention.

FIG. 3 illustrates a first method of producing an LTCC substrate according to an embodiment of the present invention in which a stack of green ceramic tape sheets having a cavity formed in the stack is provided at a step 40, and a template having an opening corresponding to the cavity is provided at a step 42. The template is placed over the stack with the opening aligned with the cavity at a step 44, and a sheet of stretchable material is provided at a step 46. Graphite is applied to the sheet of stretchable material at a step 48, and the sheet of flexible material is placed over the template at a step 50. The stack of tape sheets is isostatically laminated at a step 52, and the template and sheet of stretchable material are removed from the stack at a step 54.

Figure 4:
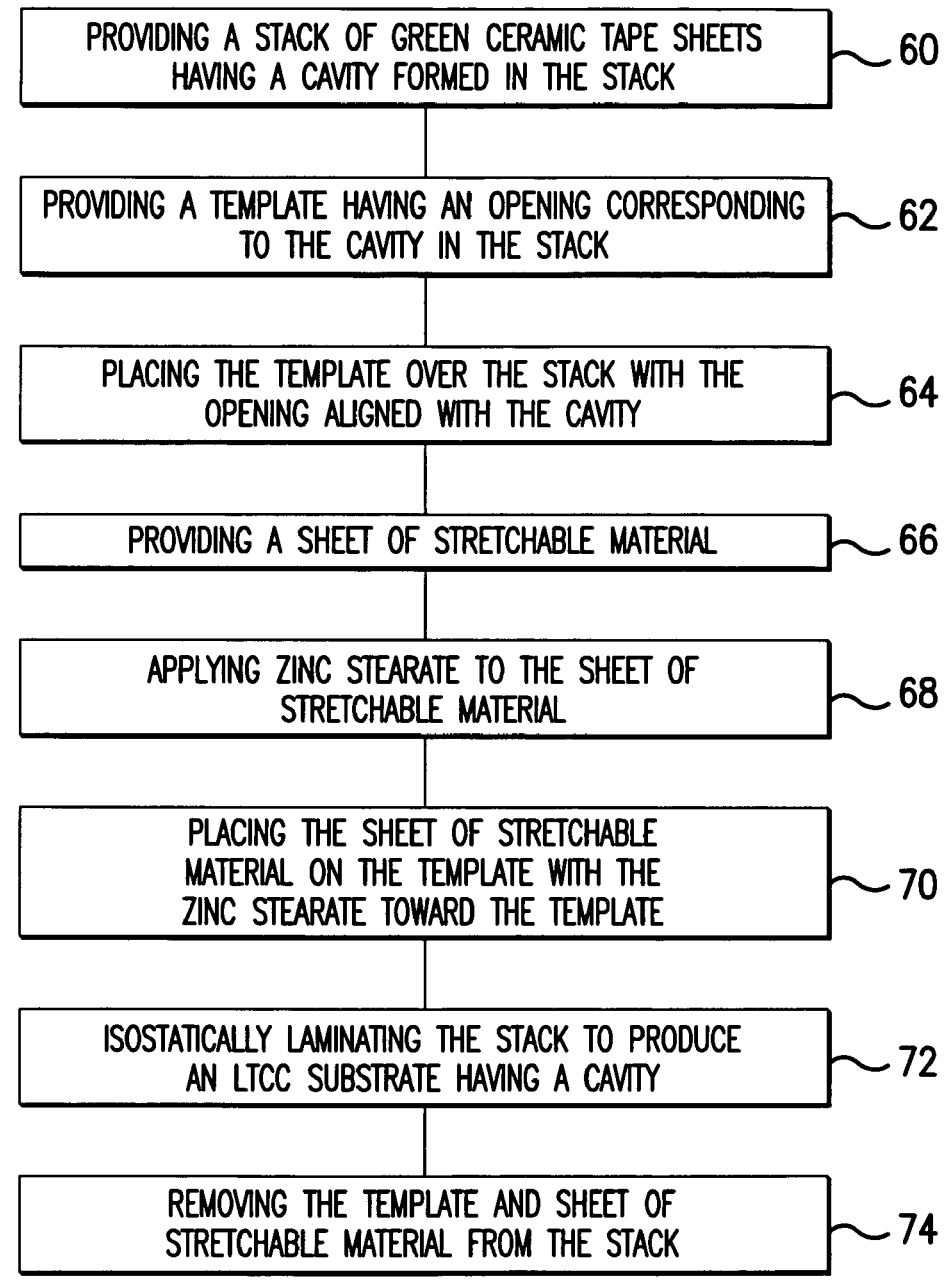
FIG. 4 is a flow chart illustrating a second method of producing an LTCC substrate according to an embodiment of the invention.

FIG. 4 illustrates a second method of producing an LTCC substrate according to an embodiment of the present invention in which a stack of green ceramic tape sheets having a cavity formed in the stack is provided at a step 60, and a template having an opening corresponding to the cavity is provided at a step 62. The template is placed over the stack with the opening aligned with the cavity at a step 64, and a sheet of stretchable material is provided at a step 46. Zinc stearate is applied to the sheet of stretchable material at a step 68, and the sheet of flexible material is placed over the template at a step 70. The stack of tape sheets is isostatically laminated at a step 72, and the template and sheet of stretchable material are removed from the stack at a step 74.

Figure 5:
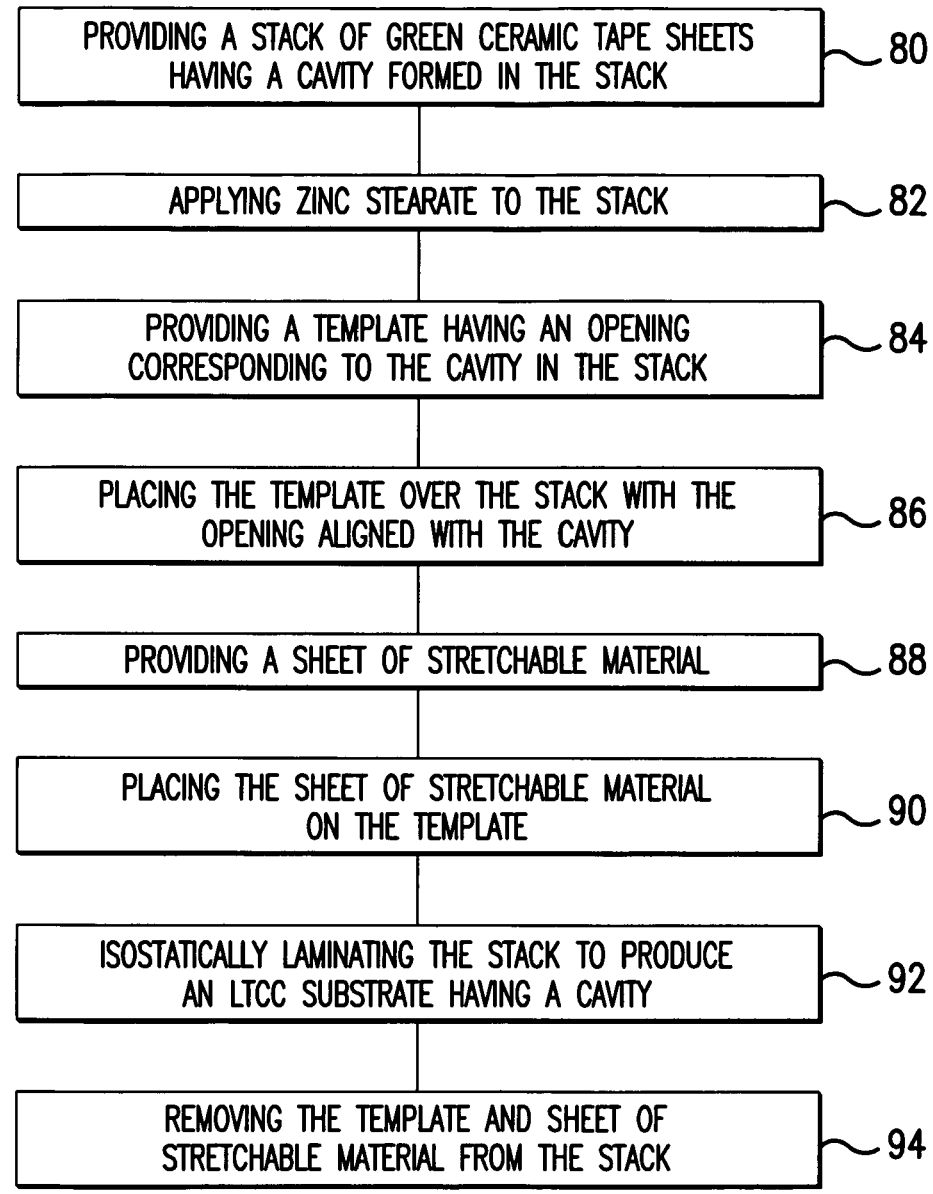
FIG. 5 is a flow chart illustrating a third method of producing an LTCC substrate according to an embodiment of the invention.

FIG. 5 illustrates a third method of producing an LTCC substrate that involves providing a stack of green ceramic tape sheets having a cavity at a step 80 and applying zinc stearate to the stack at a step 82. A template having an opening corresponding to the cavity in the stack is provided at step 84, and the template is placed over the stack with the opening aligned with the cavity at a step 86. A sheet of stretchable material is provided at step 88, and the sheet is placed on the template at step 90. Next the stack is isostatically laminated at a step 92, and the template and sheet of stretchable material are removed from the stack at step 94.

EXAMPLE 1

Table 1 below illustrates the results of a 1 mil wire bondability study for substrates produced using 1) uncoated latex 2) latex coated with zinc stearate 3) latex coated with graphite and 4) silicone coated with graphite. The graphite coated silicone did not perform satisfactorily, and it was later determined that the silicone had a talc coating that presumably produced these unsatisfactory results. While talc-less silicone was not tested, it appears likely that it would provide acceptable bondability.

TABLE 1

| | Force (grams) Required to Break 1 mil Wire Bond | | | |
|---|---|---|---|---|
| Material | Uncoated Latex | Zn Stearate Coated Latex | Graphite Coated Latex | Graphite Coated silicone |
| (20 min dry) | | | | |
| Mean | 10.76 | 9.65 | 9.65 | 7.63 |
| Sigma | 0.96 | 1.08 | 1.33 | 3.48 |
| Mean - 3 sigma | 7.85 | 6.40 | 5.64 | 0 |
| No Sticks | 0/30 | 0/30 | 0/30 | 20/30 |
| (40 min dry) | | | | |
| Mean | 9.13 | 10.83 | 10.48 | 6.9 |
| Sigma | 1.57 | 0.90 | 1.39 | 0.95 |
| mean - 3 sigma | 4.4 | 8.12 | 6.28 | 4.03 |
| No sticks | 0/30 | 0/30 | 0/30 | 27/30 |

The latex used was obtained from AirTech Advanced Materials Group, product designation SL200, having an elongation of 500+% and a maximum use temperature of 121 degrees C. While uncoated latex did not affect cavity bondability, it stuck to the substrate and elements, including metallic elements formed thereon, thus damaging the substrate. The requirement for satisfactory bondability is that the mean force required to separate the wire from the substrate be at least three standard deviations greater than a minimum force, in this case, 3 grams, and that no "no sticks" occur. As can be seen from the above data, graphite coated latex and zinc stearate coated latex both produced cavities having acceptable bondability levels.

EXAMPLE 2

Table 2 illustrates the results of a second 1 mil wire bondability study.

TABLE 2

| Material | Force (grams) Required to Break 1 mil Wire Bond | |
|---|---|---|
| | Zn Stearate Coated Latex | Graphite Coated Latex |
| Mean | 9.50 | 10.15 |
| Sigma | 1.33 | 1.34 |
| Mean - 3 sigma | 5.49 | 6.10 |
| Minimum | 7.70 | 7.40 |
| Sample Size | 30 | 30 |

As was the case with Example 1 above, these data demonstrate that the bondability of substrate cavities produced using a stretchable sheet of material to transfer pressure to cavity interiors can be improved when graphite or zinc stearate is used as a release agent instead of the conventionally used talc.

EXAMPLE 3

Table 3 illustrates the results of a bondability study using a 0.5×2.0 mil ribbon.

TABLE 3

| Material | Force (grams) Required to Break 1 mil Wire Bond | |
|---|---|---|
| | Zn Stearate Coated Latex | Graphite Coated Latex |
| Mean | 16.86 | 17.79 |
| Sigma | 2.25 | 1.57 |
| Mean - 3 sigma | 10.11 | 13.08 |
| Minimum | 9.20 | 11.6 |
| Sample Size | 105 | 105 |

Acceptable bondability in the above ribbon test required that the mean force required to separate the ribbon from the substrate be at least three standard deviations above 3.5 grams. The above data show acceptable bondability in the above case as well.

The present invention has been described herein in terms of several embodiments, it being understood that obvious modifications and additions to these embodiments will become apparent to those skilled in the relevant arts upon a reading of this disclosure. It is intended that all such modifications and additions comprises a part of this invention to the extent that they fall within the scope of the several claims appended hereto.

We claim:

1. A method of producing an LTCC substrate having improved cavity bondability comprising the steps of:
    providing a stack of green ceramic tape sheets having a cavity formed in the stack;
    providing a template having an opening corresponding to the opening in the stack;
    placing the template over the stack with the opening aligned with the cavity;
    providing a sheet of stretchable material;
    applying graphite to the sheet of stretchable material;
    placing the sheet of stretchable material on the template with the graphite toward the template;
    isostatically laminating the stack to produce an LTCC substrate having a cavity; and
    removing the template and sheet of stretchable material from the stack.

2. The method of claim 1 including the additional step of bonding a metallic element to a floor of the cavity.

3. The method of claim 1 wherein said step of providing a sheet of stretchable material comprises the step of providing a sheet of latex.

4. The method of claim 3 wherein said step of providing a sheet of latex comprises the step of providing a sheet of latex having an elongation of at least 500 percent.

5. The method of claim 3 wherein said step of providing a sheet of latex comprises the step of providing a sheet of latex having a maximum use temperature of about 121 degrees C.

6. The method of claim 3 wherein said step of providing a sheet of latex comprises the step of providing a sheet of latex having an elongation of at least 500 percent and a maximum use temperature of about 121 degrees C.

7. The method of claim 1 wherein said step of providing a sheet of stretchable material comprises the step of providing a sheet of silicone.

8. The method of claim 1 wherein said step of applying graphite to the sheet of stretchable material comprises the step of applying a graphite aerosol to the sheet of stretchable material.

9. A method of producing an LTCC substrate having improved cavity bondability comprising the steps of:
    providing a stack of green ceramic tape sheets having a cavity formed in the stack;
    providing a template having an opening corresponding to the opening in the stack;
    placing the template over the stack with the opening aligned with the cavity;
    providing a sheet of stretchable material;
    applying zinc stearate to the sheet of stretchable material;
    placing the sheet of stretchable material on the template with the zinc stearate toward the template;
    isostatically laminating the stack to produce an LTCC substrate having a cavity; and
    removing the template and sheet of stretchable material from the stack.

10. The method of claim 9 including the additional step of bonding a metallic element to a floor of the cavity.

11. The method of claim 9 wherein said step of providing a sheet of stretchable material comprises the step of providing a sheet of latex.

12. The method of claim 11 wherein said step of providing a sheet of latex comprises the step of providing a sheet of latex having an elongation of at least 500 percent.

13. The method of claim 11 wherein said step of providing a sheet of latex comprises the step of providing a sheet of latex having a maximum use temperature of about 121 degrees C.

14. The method of claim 11 wherein said step of providing a sheet of latex comprises the step of providing a sheet of latex having an elongation of at least 500 percent and a maximum use temperature of about 121 degrees C.

15. The method of claim 9 wherein said step of providing a sheet of stretchable material comprises the step of providing a sheet of silicone.

* * * * *